May 4, 1965   C. D. MORRISON ETAL   3,181,587
TIRE REMOVAL AND ASSEMBLY DEVICE
Filed Oct. 25, 1963   3 Sheets-Sheet 1
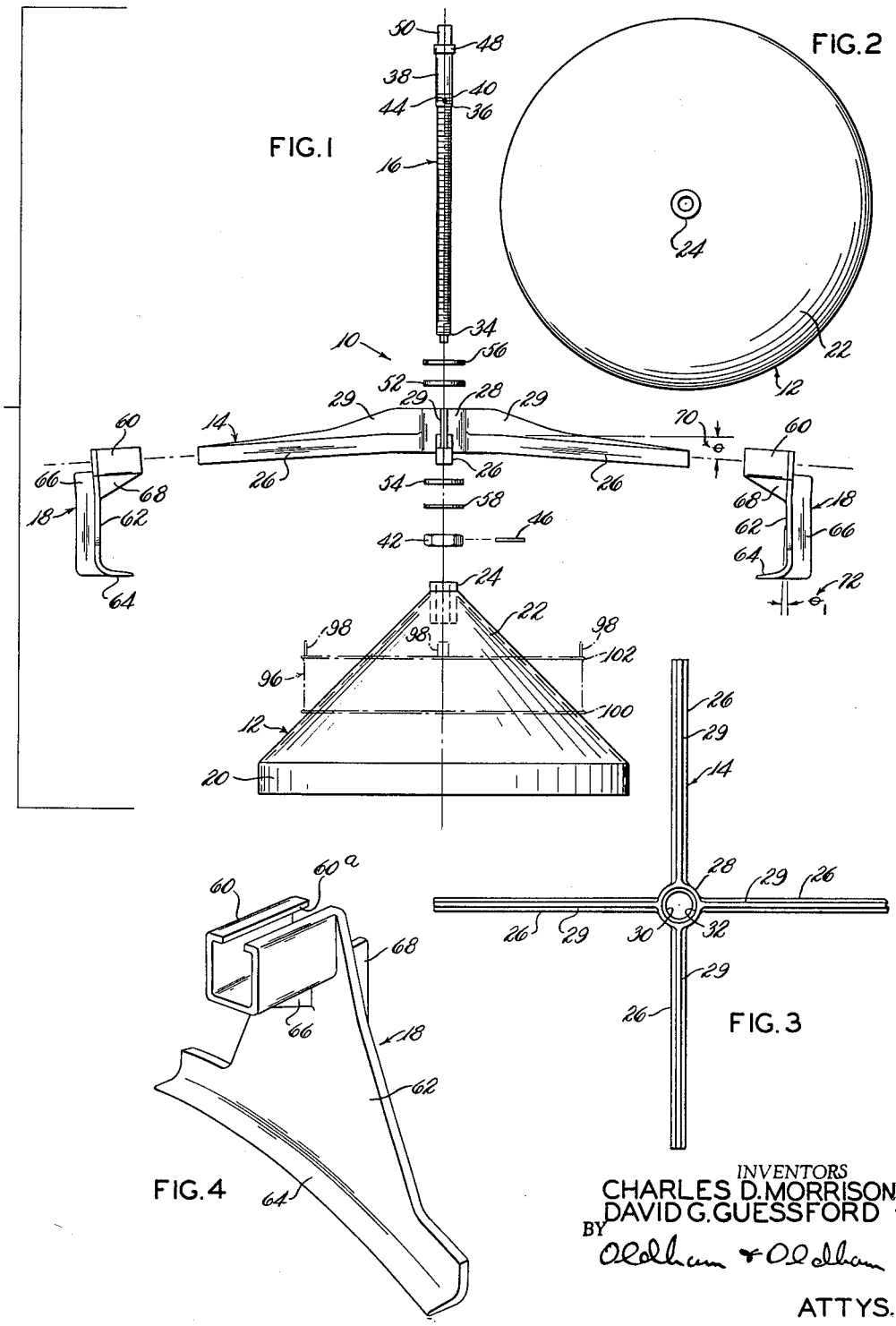
INVENTORS
CHARLES D. MORRISON
DAVID G. GUESSFORD
BY Oldham & Oldham
ATTYS.

May 4, 1965 C. D. MORRISON ETAL 3,181,587
TIRE REMOVAL AND ASSEMBLY DEVICE
Filed Oct. 25, 1963 3 Sheets-Sheet 2
FIG. 5
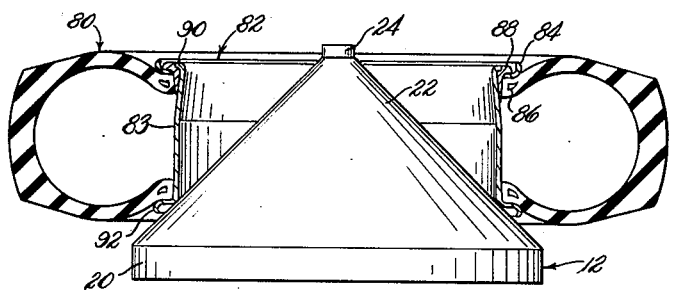
FIG. 6
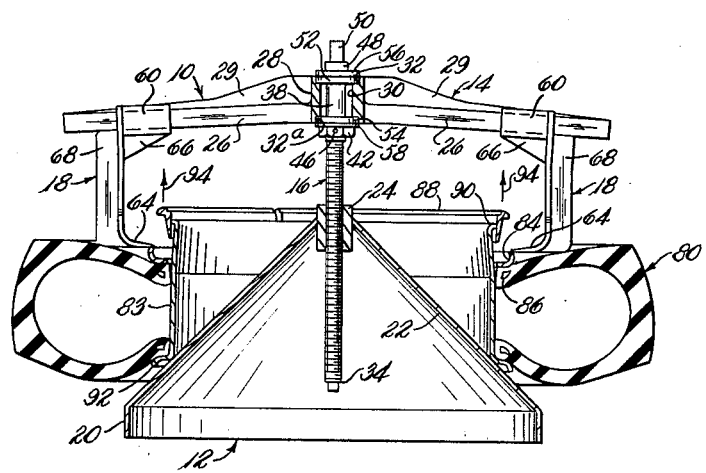
FIG. 7
INVENTORS
CHARLES D. MORRISON
DAVID G. GUESSFORD
BY
Oldham & Oldham
ATTYS.

INVENTORS
CHARLES D. MORRISON
DAVID G. GUESSFORD
BY
Oldham & Oldham

United States Patent Office 3,181,587
Patented May 4, 1965

3,181,587
TIRE REMOVAL AND ASSEMBLY DEVICE
Charles D. Morrison, 8533 Cleveland Ave. N., North Canton, Ohio, and David G. Guessford, 1317 Grant Ave., Cuyahoga Falls, Ohio
Filed Oct. 25, 1963, Ser. No. 319,031
6 Claims. (Cl. 157—1.17)

This invention relates to a tire removal and assembly device particularly adapted for truck and bus tires wherein the tire changing operation is facilitated and simplified and where the apparatus can provide a high degree of safety in the tire inflation operation.

Heretofore it has been known that changing bus or truck tires by hand is an extremely difficult operation which causes wear and damage to tires, rims and beads because of the excessive hammering or crowbar prying which is necessary. Many attempts have been made to produce a tool or machine for changing truck or bus tires, but these machines are characterized by high cost, difficulty of operation, and danger to the operator. Any time where tires, that have been rusted onto a wheel for a long time need removal the equipment available by the present art is not satisfactory. Also, generally many man hours are required for tire changing with the present equipment. Further, most truck and bus tire changers today are not adaptable to complete removal of the tire from the rim assembly.

It is the general object of the present invention to avoid and overcome the foregoing and other difficulties of prior art practices by the provisions of a tire removal and assembly device which is simple and inexpensive, but which is sturdy, safe and extremely effective in operation.

A further object of the invention is to provide a tire removal and assembly device which utilizes a spider assembly having a plurality of extending arms which are bent slightly downwardly so that pressure shoes slidably received on the arms thereof tend to apply pressure to a tire bead in an axially inwardly and slightly radially inwardly direction when the spider is moved to apply pressure through the shoes.

Another object of the invention is to provide a tire removal and assembly device wherein a spacer ring may be attached to a rim after one bead of a tire has been broken loose so that the tire may be completely removed from the rim because of the rim extension provided by the spacer ring.

A further object of the invention is to provide a tire removal and assembly device which can be used to eliminate any chance of tire "blowoff" upon tire reassembly and inflation where a rim having a removable tire bead seat and lock ring is used.

A further object of the invention is to provide a tire removal and assembly device for truck and bus tires which is relatively small and light in weight so as to be portable to provide quick roadside tire changing.

Another object of the invention is to provide a tire removal and assembly device which in no way damages tires, rims, or beads to enhance tire life and safety of operation.

The aforesaid objects of the invention and other objects which will become apparent as the description proceeds are achieved by providing in an apparatus for removing or assemblying a pneumatic tire on a rim having a removable bead seat the combination of a conically shaped frame to mount the tire and rim in a horizontal position, a spider comprising a hub with a plurality of arms extending radially therefrom, means to mount the hub of the spider through its axis coincident with the axis of the frame so the spider is movable vertically to and from the frame, the arms of the spider being directed at a slight angle towards the frame, shoe means slidably received on each arm of the spider, the shoe means being adapted to engage the bead of the pneumatic tire, and the shoe means providing an axially inwardly and a radially inwardly directed continuous and increasing pressure onto the bead of the tire when the spider is moved towards the frame because of the extending arms of the spider having a directed angle toward the frame.

For a better understanding of the invention reference should be had to the accompanying drawings wherein:

FIGURE 1 is an exploded front elevation of the elements comprising the tire removal and assembly device of the invention;

FIGURE 2 is a plan view of the conically shaped base cone of FIGURE 1;

FIGURE 3 is a plan view of the spider of FIGURE 1;

FIGURE 4 is an enlarged perspective view of one of the shoe elements of FIGURE 1;

FIGURE 5 is a front elevation of the base cone having a pneumatic tire and rim combination, shown in vertical cross section, in operative position thereon;

FIGURE 6 represents the second step in the tire removal procedure wherein the spider and shoe assembly has broken one bead of a tire free from the removable bead ring so that it and its locking ring may be removed from the rim;

FIGURE 7 represents the third step in the tire removal process wherein an extension ring has been inserted into the rim on the side where the removable bead ring was removed with the rim assembly turned over and placed onto the base cone;

Figure 8:
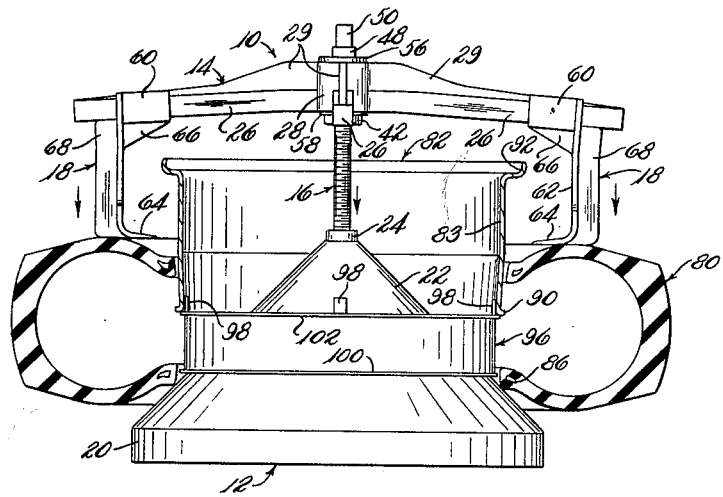
FIGURE 8 represents the fourth step of the tire removal where the spider assembly has forced the second bead of the tire from its bead seat and pushed the tire down over the rim and its extension ring.

Although the device of the invention is applicable to the removal and assembly of any tire it is most applicable to large truck and bus tires wherein one removable bead ring and a lock ring are utilized in the tire-rim and/or wheel assembly. Hence the invention has been so illustrated and will be so described.

With reference to the form of the invention illustrated in FIGURE 1 of the drawings, the numeral 10 indicated generally the tire removal and assembly device of the invention which comprises a conically shaped base support cone, indicated generally by the numeral 12, a spider, indicated generally by numeral 14, an adjusting rod, indicated generally by numeral 16, and a plurality of shoes, indicated generally by numeral 18. The detailed description and interconnected usage of these parts will be described hereinafter.

The base support cone 12 contains a cylindrically shaped base support ring 20 operatively affixed to a conically shaped upwardly extending frame portion 22. In order to receive the rod 16, a threaded nut 24 is operatively mounted at the apex of the conically shaped portion 22 so that its axis is substantially coincident with the axis of the base cone 12.

The spider 14, as best seen in FIGURE 3, comprises a plurality of arms 26 extending radially from a central hub 28. In order to provide proper strength to the arms 26, strengthening webs 29 may be formed thereon. The hub 28 contains a centrally positioned hole 30 which is adapted to be substantially in alignment with the axis of the base cone 12 when the device is assembled. A pair of recesses 32 and 32a are provided at the top and bottom of the hole 30 (see FIG. 6) in order to mount the adjusting rod 16, as more fully explained hereinafter.

The adjusting rod 16 is uniformly threaded from one end 34 to a point 36 which is at the base of an enlarged cylindrical section 38. A short portion 40 of the enlarged cylindrical section 38 is threaded to receive a locking nut 42, as will be more fully explained below. A small hole 44 is provided through the threaded portion 40 to receive a locking pin 46. A collar 48, and a squared end 50, adapted to receive a wrench or other turning means, complete the structural features of the adjusting rod 16.

As best seen in FIGURE 6, the adjusting rod 16 is positioned through the hole 30 in the spider 14 and is rotatably positioned thereon. It is extremely important that the rotatable relation of the spider 14 and the adjusting rod 16 be such as to retain the spider in a fixed vertical relation without wobble and further be able to absorb all up and down forces passed therebetween. In order to accomplish these purposes, a pair of thrust bearings 52 and 54, along with washers 56 and 58, are provided. The thrust bearing 52 is received in the recess 32 on the top of the hole 30, and the thrust bearing 54 is received in the recess 32a on the bottom of the hole 30 of the spider hub. The enlarged cylindrical section 38 of the adjusting rod 16 is machined to a tight sliding fit on the inner surface of the thrust bearings 52 and 54. The washer 56, also adapted to have a tight sliding fit with the enlarged cylindrical section 38 of the adjusting rod 16, is placed on top of the thrust bearing 52 and abuts against the collar 48. The washer 58 having a tight sliding fit with the enlarged cylindrical section 38 of the rod 16, is positioned beneath the bottom thrust bearing 54. The locking nut 42 is threadably received on the threaded portion 40 and locked in position with pin 46 passing through the hole 44 in rod 16. The locking nut 42 is screwed snugly into position to force the bearings and spider hub into engagement to insure a tight, non-wobble relationship between the spider 14 and the adjusting rod 16. The thrust features of the rotatable mounting are achieved as upward thrust is taken by the bearing 54 on recess surface 32a, whereas downward thrust is taken by the bearing 52 on recess surface 32. Under actual testing, this rotatable combination of the invention has been found capable of withstanding up to 20 tons pressure without failure. Further, this mounting insures an equal and uniformed distribution of force from the adjusting rod 16 to the spider 14 during the tire removal, or assembly operation.

The shoes 18, FIGURE 4, contain an elongated substantially square channel 60 having a slot 60a which is adapted to slidably engage the arms 26 of spider 14, and receive one of the webs 30 in the slot 60a. A tapered base supporting frame 62 operatively connects a relatively wide, arcuately shaped angled footer 64 to the channel 60. The footer 64 is arcuately shaped to a median radius so that it will properly engage a bead of any tire to be changed. Integral strengthening ribs 66 and 68 may be provided on the frame 62 to insure adequate strength for the shoes 18.

As an extremely important feature of the invention, the arms 26 of spider 14 are bent downwardly, as seen in FIGURE 1, at an angle $\theta$, indicated by numeral 70 in FIGURE 1, from a plane perpendicular to the longitudinal axis of the hub 28 of the spider 14. The angle $\theta$ can be between about 2° and about 10°, with the most preferable angle being about 3°. The shoes 18 are also bent to an angle $\theta_1$, indicated generally by numeral 72 in FIGURE 1, to compensate for the downward inclination to the arms 26, preferably at an angle equal to $\theta$. This insures that the supporting frames 62 of the shoes 18 are substantially vertically positioned and the lower face of the footers 64 are substantially horizontal when the channels 60 slidably mount the shoes 18 onto the arms 26 of the spider 14. Thus, it is seen that the footers 64 will remain in a substantially horizontal position but move upwardly as the channels 60 are moved along the arms 26 towards the hub 28. It is this upward movement along the inclined arms of the spider which in part greatly facilitates the operation of the apparatus. Further structural features which facilitates the operation of the apparatus are the compensating inclinations to the supporting frames 62 of the shoes 18 which are beneath the strengthening webs 68 and means the footers 64 are off-set in relation to the channels 60 which provides an off-center pressure through the footers when the device is used tending to rotate the footers 64 radially inwardly.

FIGURE 5 illustrates the first step in a tire removal with the apparatus of the invention. A pneumatic tire 80 mounted onto a rim, indicated generally by the numeral 82, is placed over the cone base 12, as illustrated. The rim 82 is of the conventional type for mounting truck or bus tires wherein a removable bead seat, or a bead retaining flange, or ring 84 is held in position by the tire bead 86 pressing it against split lock ring 88 with the lock ring 88 held in position against a very small retaining lip 90 of a rim base 83. The side of the rim base 83 having the removable bead retaining flange 84 thereon is placed upwardly. The other bead retaining flange 92 is an integral part of the rim base 83.

FIGURE 6 represents the second step in the tire removal. In this step, the adjusting rod 16 has been screwed down through the threaded nut 24 into the base cone 12 by any suitable means (not shown such as a pneumatic wrench, so that with the shoes 18 positioned on the arms 26 of the spider 14, the shoes 18 force the removable bead seat, or ring 84 and the tire bead 86 axially inwardly away from the locking ring 88 and the raised lip 90, as illustrated. With the tire 80 and the removable bead seat 84 forced down as shown in FIGURE 6, the split locking ring 88 may be removed upwardly over the raised lip 90, as indicated by the arrows 94. It is then an easy matter to release the pressure on the spider shoe assembly by moving the adjusting rod 16 upwardly which allows the removable bead seat 84 to be taken off the rim 82.

FIGURE 7 illustrates the third step in the tire changing act wherein the spider, shoes, and adjusting rod have been removed from the base cone 12, and an extension ring 96 having a plurality of tabs 98 is attached to the rim base 83 on the side where the bead seat was removed by engaging the tabs with the rim base 83. Reinforcing beads 100 and 102 strengthen the extension ring 96. Further, the bead 102 seats upon the lip 90 of the rim 82 when the tabs 98 are inserted. The tire 80 is then placed on the base cone 12 with the extension ring 96 downwardly, as indicated. The purpose of the extension ring 96 is to allow the tire 80 to be completely removed from the rim 82 when the tire 80 tends to stick to the rim 82 across the entire width thereof even after both beads have been broken from their bead seats because of age, rust, or possible slight size differences. The function of the extension ring 96 is clearly seen with reference to FIGURES 8 and 9. FIGURE 8 illustrates the fourth step of the tire changing operation which shows the spider shoe and adjusting rod assembly placed back on top of the tire with the adjusting rod 16 screwed in the threaded nut 24. The adjusting rod 16 is tightened down again by any suitable means causing the shoes 18 to break the other bead of the tire 80 from the flange 92 and associated rim means. Because of the extension to the rim base 83 provided by the extension ring 96, the tire 80 can be pushed entirely off the rim by screwing the adjusting rod 16 downwardly.

Figure 9:
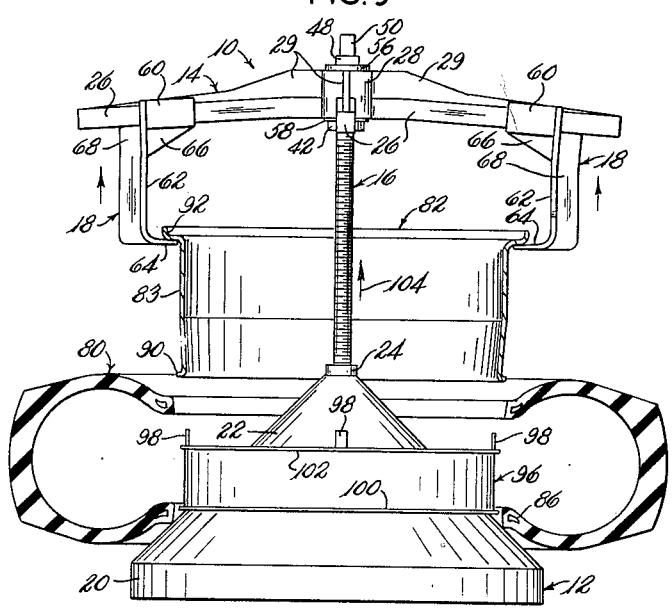
FIGURE 9 represents the last step of the process and illustrates the removal of the rim from the tire by the spider and shoe assembly after the tire has been removed therefrom.

FIGURE 9 illustrates the last step in the tire removal where the shoes 18 are moved in on the arms 26 of spider 14 so they engage the permanent bead retaining flange 92 of the rim base 83. The adjusting rod 16 is then screwed upwardly in the direction of arrow 104 to pull the rim base 83 clear of the tire 80, as the tire will be held down by its own weight, or by the operator's foot.

In the tire assembly operation, the steps are substantially reversed with the tire generally being pushed back onto the rim base by hand and then placed in substantially the position indicated in FIGURE 6 with the shoes 18 holding the removable bead seat 84 against the tire bead 86 while the lock ring 88 is pushed back into position over the lip 90. The adjusting rod 16 is then screwed outwardly to permit the removable bead seat 84 to seat against the locking ring 88, possibly while the tire is partially inflated. The spider and shoe assembly may be left in position adjacent but above the tire while tire 80 is fully inflated to prevent possible "blowoff" of the removable bead seat 84 and the locking ring 86. Once the tire 80 has been properly inflated and the removable bead seat 84 has been fully seated on the locking ring 88, the tire and rim are properly assembled and the spider, shoes and adjusting rod are removed.

As stated heretofore, a first important feature of the invention lies in the secure rotatable mounting of the spider 14 to the adjustable rod 16. A second important feature lies in the inclined arms 26 of the spider 14 upon which the shoes 18 are slidably mounted. The bend or inclination of the arms 26 toward the base cone 12 with the corresponding outward bend, or inclination of the shoes 18 provides an axially inward and a radially inward force onto the tire bead 86 as the adjusting rod 16 is screwed downwardly. The advantage of the radially inward force is that this tends to force the footers 64 between the tire bead and the rim to help break the bead free. One reason for the radially inward force is the radially off-set mounting of the footers 64 of the shoes 18 which tend to rotate the shoes 18 under operative pressure to move inwardly. A further reason the radially inward force is present is that the shoes 18 tend to move along the arms 26 towards the hub 28 of the spider 14 as pressure is brought to bear thereon because this movement tends to release pressure on the shoes as they move slightly vertically upwardly or away from the tire bead, as they move radially inwardly on the arms 26. In actual use, the shoes 18 will generally not move radially inwardly by themselves but must be tapped lightly by a hammer. However, heretofore when the inclination of the arms 26 of spider 14 toward the base cone was not utilized, any hammering or forcing of the shoes 18 was not effective, as they tended to bind against or between the rubber side wall of the tire and the radially extending arms of the spider. In prior apparatus, it was found necessary to back off the adjusting rod 16 while at the same time hammering on the shoes 18 to get them to move radially inwardly. Thus, time and efficiency were lost. Further, a better moving action of the shoes 18 is also obtained when the footer portions 64 of the shoes 18 are made horizontal. Thus, the angle and the forces involved have been solved by the spider, shoe, adjusting rod structure of the invention which provides a safe, fast and efficient truck and bus tire changer. Further, the extremely dangerous situation of repositioning the removable bead seat and the locking ring in the tire assembly and subsequent tire inflation, has been eliminated because the tire bead and the removable bead seat can be contained against "blowoff" by the shoe and the spider assembly during tire inflation if merely retained in operative position an inch or so above the upper margin of the rim 82. The extension ring provides a simple and effective method to completely remove tires from rims where there is a tendency for the tire to stick to the rim even after both beads have been broken from their respective bead seats.

It will be realized that any suitable lock means can be used in place of the nut 42 to retain the bearings 52 and 54 in position. The shoes 18 will form a smooth sliding contact with the spider arms 26 after some use but the contact can be lubricated to facilitate movement of the shoes radially inwardly under load.

In view of the above, it is believed that the objects of the invention have been achieved.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. In an apparatus for removal or assembly of a pneumatic tire from a pneumatic tire-rim assembly which rim has a removable bead ring and a locking ring the combination of a base cone to support said tire-rim assembly, an adjusting rod threadably positioned in the apex of said base cone and extending outwardly therefrom for vertical movement relative thereto, a spider having a central hub rotatably mounted through said hub on the extended end of said adjusting rod, said spider having a plurality of arms equally spaced circumferentially and extending radially from said central hub with said arms being directed towards said base cone at an angle of between about 2° and about 10°, a plurality of shoes slidably received on said arms, said shoes having lower portions extending axially outwardly at an angle substantially equal to the angle of inclination of said arms and having radially offset footers adapted to engage with the bead ring of said rim, and means to rotate said adjusting rod to force said footers of said shoes against the removable bead ring and the bead of said tire with a force substantially parallel to the axis of the tire-rim assembly and a force directed substantially radially inwardly towards the axis of the tire-rim assembly because of the offset footers and the tendency of the shoes to move radially inwardly on the arms of the spider to relieve pressure.

2. A tire removal apparatus as defined in claim 1 which includes a cylindrically shaped extension ring which is removably positionable on the rim on the side thereof with the removable bead ring and is of substantially the same but a smaller diameter than such side of the rim, after the removal of the removable bead ring and the locking ring, to facilitate complete removal of the tire from the rim.

3. A tire removal apparatus as defined in claim 1 in which the shoes are directed radially inwardly towards the base cone for a portion of their length and then extend radially outwardly at the same angle as the arms of the spider, said radially offset of the footers being substantially flat and being positioned substantially parallel to the plane of the tire-rim assembly.

4. A tire removal apparatus as defined in claim 1 wherein a pair of thrust bearings are provided on said adjusting rod and engage opposite ends of said hub to secure a non-wobble rotatable mounting of the spider to the adjusting rod with said bearings being adapted to equally accept thrust in either direction along the axis of the adjusting rod.

5. In a tool for changing large pneumatic tires of a rim mounted pneumatic tire assembly which rim has a removable bead seat the combination of a conically shaped mounting frame having a cylindrically shaped base to support said frame, a threaded nut operatively affixed in the apex of said mounting frame, a threaded rod removably received and threadably engaged with said threaded nut for relative vertical movement therebetween, said rod lying on the axis of said mounting frame, said rod having an extending end, a spider frame comprising a central hub with at least four legs equally spaced and extending radially therefrom, said hub being rotatably mounted through the axis of said hub on the extended end of said threaded rod so that at least a part of the extended end protrudes, said legs having slight downward angles towards said mounting frame, thrust bearing means on said threaded rod insuring the tight and fully supported rotatable mounting of said spider hub on said threaded rod by engaging opposed ends of said hub;

shoe means slidably received on each leg extending from said hub and adapted to engage the bead of said large pneumatic tires over a substantial arc, said shoe means having footers thereon curved to substantially fit the radius of the bead, said shoe means tending to move radially inwardly to follow the contour of the rim containing the bead seat as pressure is applied thereto through the spider arms, and spacer ring means adapted to removably engage the rim at one edge thereof to provide an extended ring to assist in complete removal of the tire from the rim.

6. In an apparatus for removal or assembly of a pneumatic tire from a pneumatic tire-rim assembly which rim has a removal bead ring and a locking ring the combination of a base cone to support said tire-rim assembly, an adjusting rod threadably positioned in the apex of said base cone and extending outwardly therefrom for vertical movement, a spider having a central hub rotatably mounted through said hub on the extended end of said adjusting rod, said spider having a plurality of arms equally spaced circumferentially and extending radially from said central hub with said arms being inclined towards said base cone, said adjusting rod being rotatable to move said spider in substantially parallel relation towards said tire-rim assembly, a pair of thrust bearing means on said adjusting rod operatively engaging opposite ends of said hub to provide a non-wobble rotatable mounting of the spider to the adjusting rod with said bearing means being adapted to equally accept thrust in either direction along the axis of the adjusting rod, and a plurality of shoes slidably received on said arms of said spider, said shoes having radially off set footers with substantially horizontal lower surfaces adapted to engage with the bead ring of said rim or other portions of the tire-rim assembly.

References Cited by the Examiner
UNITED STATES PATENTS

| | | | |
|---|---|---|---|
| 1,720,614 | 7/29 | Welch | 157—1.2 |
| 1,975,148 | 10/34 | Hassett. | |
| 2,446,963 | 8/48 | Stolz | 157—1.2 |
| 2,650,659 | 9/53 | Morgan | 157—1.2 |
| 2,692,013 | 10/54 | Duquesne | 157—1.2 |

GRANVILLE Y. CUSTER, Jr., *Primary Examiner.*